No. 734,880. PATENTED JULY 28, 1903.
N. H. JORGENSEN & H. R. PALMER.
FLOUR MILL GEARING ATTACHMENT.
APPLICATION FILED OCT. 27, 1902.
NO MODEL.

Fig. 1ª.

Witnesses

Inventors
N. H. Jorgensen.
H. R. Palmer.
By O'Meara & Brock,
Attorneys

No. 734,880. Patented July 28, 1903.

UNITED STATES PATENT OFFICE.

NIELS H. JORGENSEN AND HARRY R. PALMER, OF SLEEPYEYE, MINNESOTA.

FLOUR-MILL GEARING ATTACHMENT.

SPECIFICATION forming part of Letters Patent No. 734,880, dated July 28, 1903.

Application filed October 27, 1902. Serial No. 128,980. (No model.)

*To all whom it may concern:*

Be it known that we, NIELS H. JORGENSEN and HARRY R. PALMER, citizens of the United States, residing at Sleepyeye, in the county of Brown and State of Minnesota, have invented a new and useful Flour-Mill Gearing Attachment, of which the following is a specification.

Our invention is an improvement in gearing attachments for flour-packers; and the object is to provide a gear which will obviate the liability of clippings from the bevels falling into the flour being packed.

In packers now extensively in use the bevels are located directly above the sack or barrel being packed, and as the machine does not run continuously, but is stopped after the filling of each sack or barrel, the frequent engagement and disengagement of the gears cause them to wear rapidly, the metal particles getting into the flour. We overcome this difficulty by keeping the gear in position at all times, cutting the counter-shaft, and inserting therein a spiral gear, which is fully illustrated in the accompanying drawings, in which—

Figure 1:
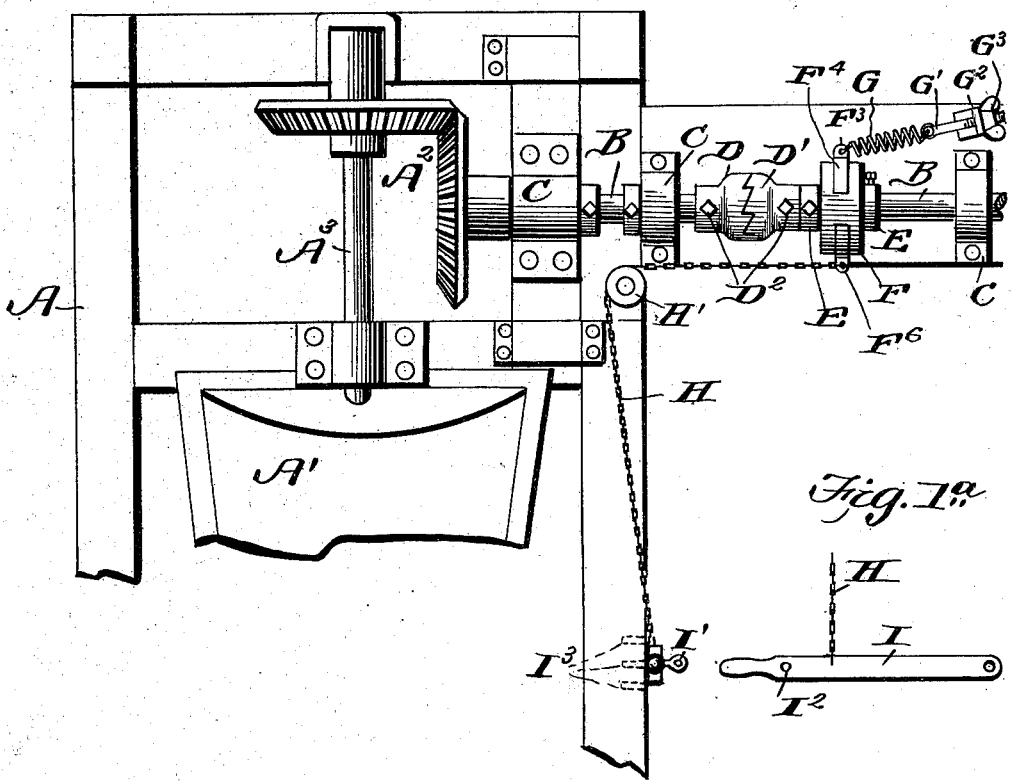
Figure 2:
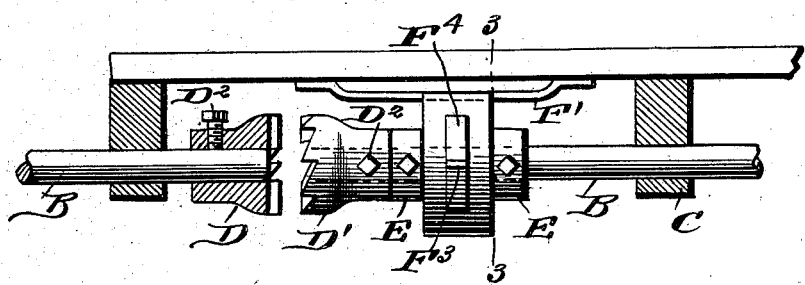
Figure 3:
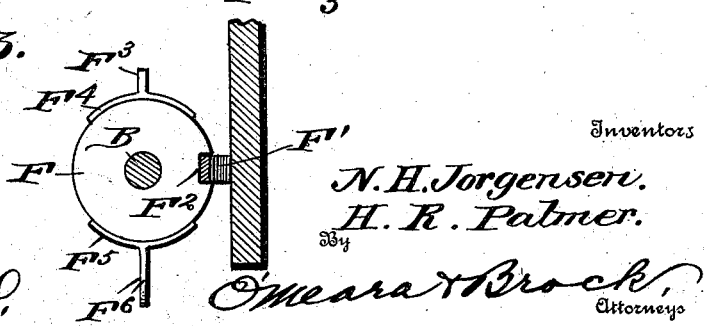

Figure 1 is an elevation of the upper portion of the flour-packing machine, showing our improved clutch in position. Fig. 1$^a$ is a detail view illustrating the connection of the chain to the operating-lever. Fig. 2 is an enlarged detail plan view showing the clutches open, and Fig. 3 is a detail sectional view on or about the line 3 3 of Fig. 2.

In the drawings, A represents the upper part of the frame of a packer, A' a part of the packing-case, and A$^2$ the gears adapted to rotate the shaft A$^3$. These parts are common to the packers now in use.

B is the counter-shaft by which motion is imparted to the gears A$^2$.

C C are post-boxes in which the counter-shaft is journaled. Spiral clutch members D D' are secured to the cut ends of the counter-shaft, respectively, being prevented from turning on the shaft by set-screws D$^2$.

Between collars E E a block F is loosely mounted, a bracket F' preventing the block from turning, the bracket fitting into a groove F$^2$, formed in the block.

A spring G is secured to the lug F$^3$, formed on a bracket F$^4$, carried on the upper part of the spring, being secured to a rod G', the rod passing through a bracket G$^2$ and carrying a tension-nut G$^3$ at its outer end. A bracket F$^5$, carrying a lug F$^6$, is secured to the under side of the block, and to the lug is secured one end of a chain H, the chain passing around a pulley H' and being secured at its other end to a lever I, pivotally secured to a part of the frame A. A pin I' fits through an aperture I$^2$ in the lever and engages recesses I$^3$, produced in the frame A. It is readily seen that as soon as the lever is released by withdrawal of the pin the spring G will automatically draw the clutch D' from engagement with the clutch D, and by drawing the lever down the clutches are engaged and the gears started without the jar produced by the positive engagement of a revolving gear with a stationary one.

Having thus fully described our invention, what we claim as new, and desire to secure by Letters Patent of the United States, is—

1. The combination with a cut counter-shaft, of spiral clutch members arranged on the adjacent ends of said shaft, a block loosely mounted on said shaft, means for preventing lateral or revoluble motion of the block, a spring adapted to withdraw the clutch members from engagement one end of said spring being secured to the block, a chain attached at one end to the block, a lever to which the opposite end of the chain is attached, and means for locking the lever in a lowered position.

2. The combination with spiral clutch members carried by a cut counter-shaft, of a block loosely mounted on the shaft, said block being recessed on one side, a bracket secured adjacent the shaft and adapted to extend into said recess and prevent the block from turning, perforated ears formed on opposite sides of the block, a spring secured to one of said ears, and a chain secured to the other, and means for preventing lateral movement of the block.

NIELS H. JORGENSEN.
HARRY R. PALMER.

Witnesses:
W. W. SMITH,
FRANK E. PALMER.